(12) United States Patent
Miremadi

(10) Patent No.: US 7,068,951 B2
(45) Date of Patent: Jun. 27, 2006

(54) OPTICAL SIGNAL RECEIVER WITH RPM, DATA AND DATA BAR OUTPUT

(75) Inventor: Reza Miremadi, West Hills, CA (US)

(73) Assignee: Optical Communication Products, Inc., Woodland Hills, CA (US)

( * ) Notice: Subject to any disclaimer, the term of this patent is extended or adjusted under 35 U.S.C. 154(b) by 835 days.

(21) Appl. No.: 10/065,356

(22) Filed: Oct. 8, 2002

(65) Prior Publication Data

US 2003/0193704 A1 Oct. 16, 2003

Related U.S. Application Data

(60) Provisional application No. 60/371,818, filed on Apr. 11, 2002.

(51) Int. Cl.
*H04B 10/06* (2006.01)
*H03F 3/08* (2006.01)
*H03F 17/00* (2006.01)

(52) U.S. Cl. .................. 398/202; 398/208; 250/214 A; 330/59

(58) Field of Classification Search ................ 398/202, 398/208; 250/214; 330/59, 308
See application file for complete search history.

(56) References Cited

U.S. PATENT DOCUMENTS

| | | | |
|---|---|---|---|
| 4,498,001 A | 2/1985 | Smoot | 250/214 |
| 4,521,920 A | 6/1985 | Forsberg et al. | 455/619 |
| 4,623,786 A | 11/1986 | Rodwell | 250/214 |
| 4,855,687 A | 8/1989 | Hebert Raymond T. | 330/304 |
| 5,008,524 A | 4/1991 | Reutter et al. | 250/214 |
| 5,012,202 A | 4/1991 | Taylor | 330/284 |
| 5,023,951 A | 6/1991 | Kahn | 455/619 |
| 5,030,925 A | 7/1991 | Taylor | 330/308 |
| 5,198,658 A | 3/1993 | Rydin | 250/214 |
| 5,311,353 A | 5/1994 | Crawford | 359/333 |
| 5,329,115 A | 7/1994 | Lim | 250/214 |
| 5,382,920 A | 1/1995 | Jung | 330/308 |
| 5,410,282 A | 4/1995 | Larrick et al. | 330/149 |
| 5,485,302 A | 1/1996 | Braun et al. | 359/189 |
| 5,602,510 A | 2/1997 | Bayruns et al. | 330/282 |

(Continued)

FOREIGN PATENT DOCUMENTS

DE 3607688 9/1987

(Continued)

OTHER PUBLICATIONS

"Technical Specification for Optical Transceiver Module", Sumitomo Electric, dated May, 1999.

(Continued)

*Primary Examiner*—M. R. Sedighian
(74) *Attorney, Agent, or Firm*—Barlow, Josephs & Holmes, Ltd.

(57) ABSTRACT

An optical signal receiver system provides for five (5) signals, namely VCC, Ground, RPM (Receiver input Power Monitor), Data, and Data Bar outputs, using only the four external pins of a conventional TO-style can package. To provide for five signals on only four pins, two of the output signals are superimposed on each other in which one has a DC value (RPM) and one has an AC value (Data or Data Bar). Once the combined signal comes out of the TO can, the combined signal can be separated into two separate signals using a capacitor which blocks the DC signal (Data or Data Bar) and allows the AC signal to go through. The DC information is then extracted by filtering the AC information from the combined signal with a Current Sense Circuit.

32 Claims, 5 Drawing Sheets

U.S. PATENT DOCUMENTS

| | | | |
|---|---|---|---|
| 5,646,573 A | 7/1997 | Bayruns et al. | 330/59 |
| 5,777,507 A | 7/1998 | Kaminishi et al. | 327/514 |
| 5,889,605 A | 3/1999 | Claverie et al. | 359/189 |
| 6,181,454 B1 * | 1/2001 | Nagahori et al. | 398/210 |
| 6,242,732 B1 | 6/2001 | Rantakari | 250/214 |
| 6,333,804 B1 | 12/2001 | Nishiyama et al. | 359/189 |
| 6,404,281 B1 | 6/2002 | Kobayashi | 330/185 |
| 6,768,384 B1 * | 7/2004 | Mohandas et al. | 330/308 |
| 6,864,749 B1 * | 3/2005 | Seetharaman et al. | 330/308 |
| 2001/0050333 A1 | 12/2001 | Feng et al. | |
| 2002/0080475 A1 | 6/2002 | Cornelius et al. | |

FOREIGN PATENT DOCUMENTS

| | | |
|---|---|---|
| DE | 3633984 | 4/1988 |
| JP | 10242774 | 9/1998 |
| JP | 2002084149 | 3/2002 |
| WO | WO9012452 | 10/1990 |

OTHER PUBLICATIONS

"SDH/SONET STM1/OC3 Transimpedance Amplifier", Philips Semiconductors, dated Sep. 29, 2000.

"Technical Specification for Optical Transceiver Module", Sumitomo Electric Iindustries, Ltd., dated Feb. 1998.

* cited by examiner

OPTICAL SIGNAL RECEIVER WITH RPM, DATA AND DATA BAR OUTPUT

CROSS REFERENCE TO RELATED APPLICATIONS

This Application claims the benefit of earlier files U.S. Provisional Patent Application No. 60/371,818, filed Apr. 11, 2002.

BACKGROUND OF INVENTION

The instant invention relates to optical receivers, and more particularly to an optical signal receiver system that provides for 5 signals, namely VCC, Ground, RPM (Receiver input Power Monitor), Data, and Data Bar outputs, using only the four external pins of a conventional TO can package.

Historically, the optical receiver is packaged in a metal housing which usually incorporates the optics as well. One such package is the TO can which, as illustrated in FIG. 1, has four external electrical leads. One of the leads is welded to the case (Pin1—ground) while the other three go inside the case in order to bring out or feed in three additional signals (Pins 2–4).

The schematic of a typical optical receiver is shown in FIG. 2. There are two major components in the receiver, namely the photodiode and the TIA (Transimpedance Amplifier). The ideal hookup for the TIA requires all four pins. These pins are Vcc (voltage supply), Ground, Data and Data Bar outputs. This poses no problem for a standard part configuration.

However, on some designs, there is a need for bringing out another signal from the photodiode called RPM. If this is done, the Data Bar is usually not brought out of the package and the only output signal is Data (FIG. 3). Since Data and Data Bar are compliments of each other, an arrangement that does not have both signals reduces the output signal by half.

SUMMARY OF INVENTION

The present invention provides a solution in which all five signals are made available with only four external pins.

In order to provide for five signals on only four pins, two of the output signals are superimposed on each other in which one has a DC value (RPM) and one has an AC value (Data or Data Bar) (FIG. 4). This is possible because the AC signal coming out of Dout and Dout Bar have an average DC value of zero (since it is a balanced signal of equal ones and zeros). Once the combined signal comes out of the TO can, the combined signal can be separated into two separate signals using a capacitor which blocks the DC signal (Data or Data Bar) and allows the AC signal to go through. The DC information is then extracted by filtering the AC information from the combined signal (Current Sense Circuit). Components R1 and C1 make sure that the output signal (Data or Data Bar) does not feedback to the input of the TIA by removing the AC component of the signal.

Accordingly, among the objects of the instant invention are: the provision of an optical signal receiver that provides 5 signals, namely Vcc, Ground, RPM, Data, and Data Bar outputs, using only the four external pins of a conventional TO can package.

Other objects, features and advantages of the invention shall become apparent as the description thereof proceeds when considered in connection with the accompanying illustrative drawings.

BRIEF DESCRIPTION OF DRAWINGS

In the drawings which illustrate the best mode presently contemplated for carrying out the present invention.

DETAILED DESCRIPTION

Figure 1:
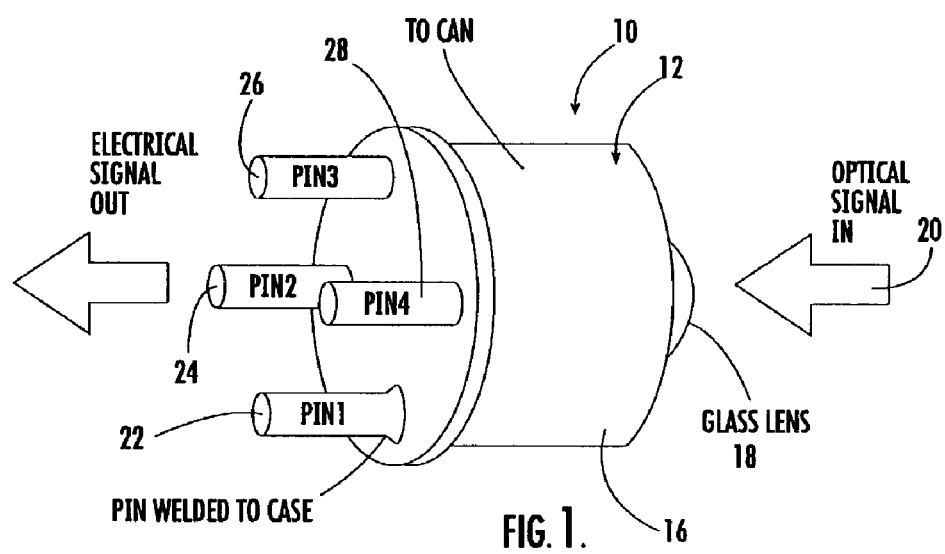
FIG. 1 is a perspective view of an optical receiver package in accordance with the present invention.
Figure 2:
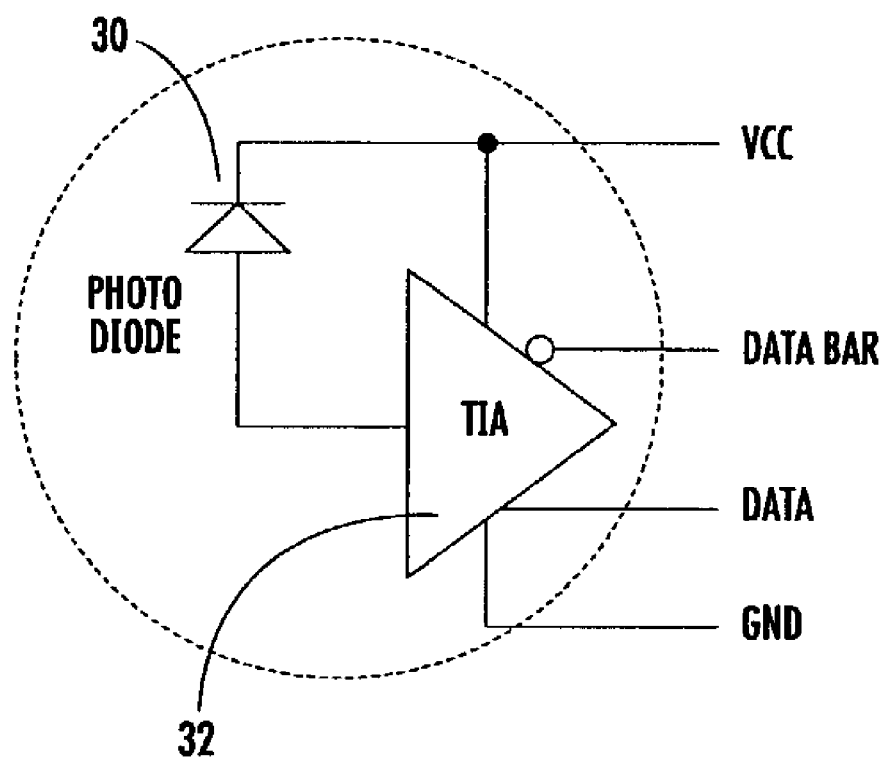
FIG. 2 is a schematic view of a conventional output signal arrangement from an optical receiver.
Figure 3:
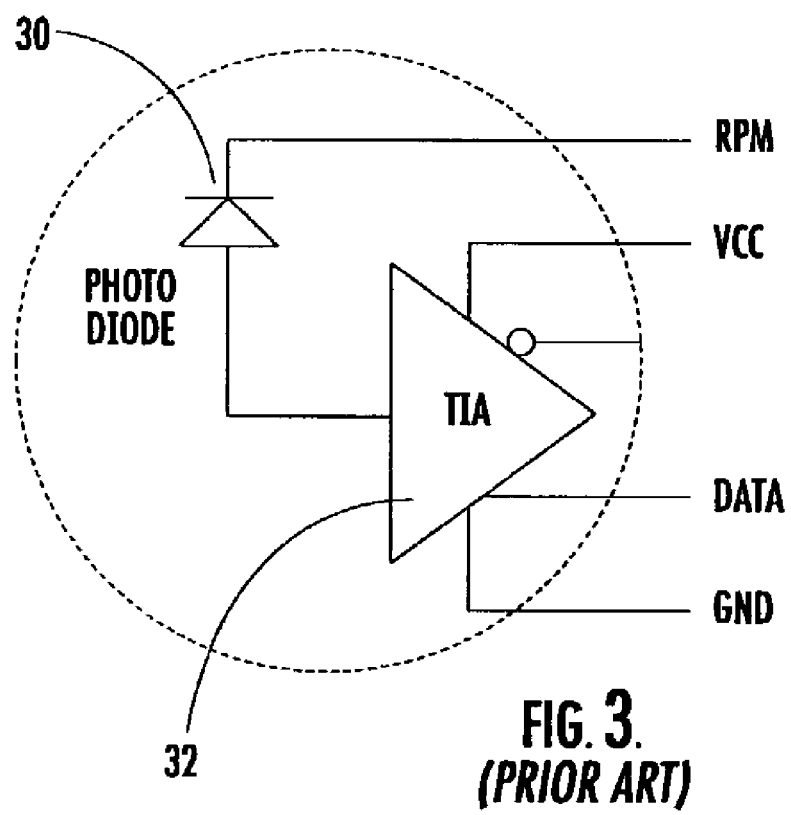
FIG. 3 is a schematic of an alternative output signal arrangement (including PRM) from an optical receiver package.
Figure 4:
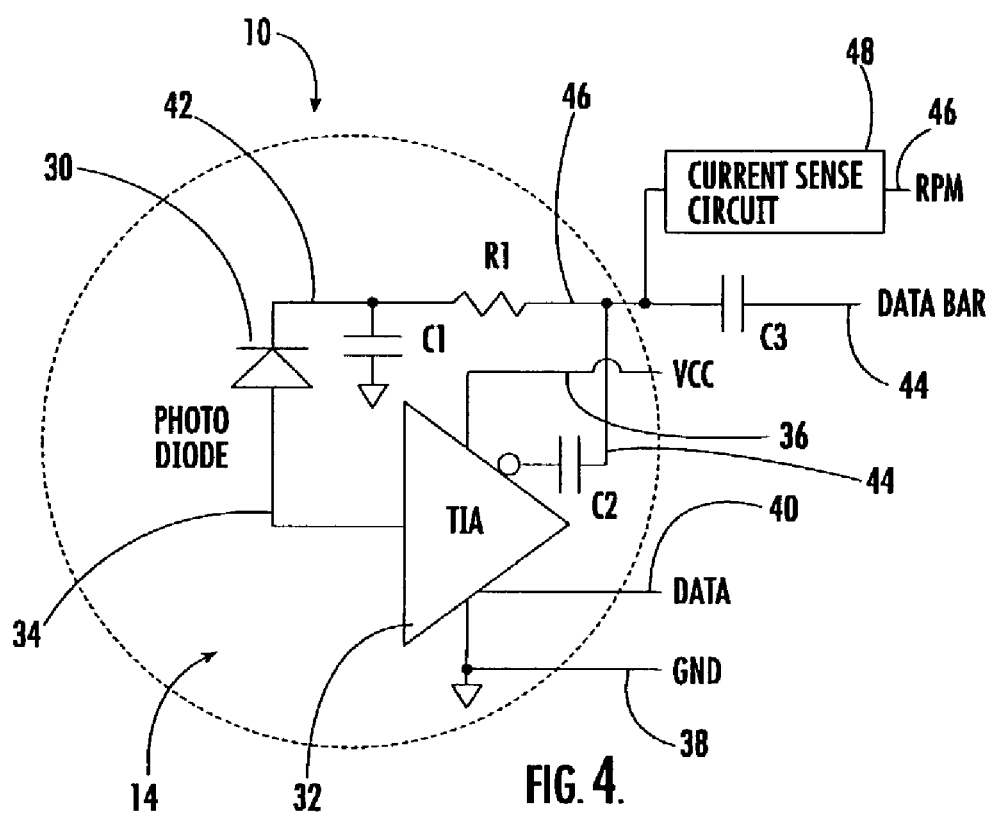
FIG. 4 is a schematic view of a first embodiment of the output signal arrangement of the present invention.

Referring now to the drawings, the optical signal receiver of the instant invention is illustrated and generally indicated at 10 in FIGS. 1 and 4. As will hereinafter be more fully described, the instant optical signal receiver 10 comprises a packaging portion generally indicated at 12 and a circuit portion generally indicated at 14.

The packaging portion is best illustrated in FIG. 1 wherein the package 12 includes a can-shaped housing 16, a lens 18 configured in the front face of the housing 16 for permitting an optical light signal 20 to pass into the interior of the can, and four (4) output pins contacts 22, 24, 26, 28 for respective electrical signals. The individual pins 22, 24, 26, 28 are connected to respective contacts of the circuit 14 to be described hereinafter. The TO can package is conventional and well known in the optical receiver art, and no further specific construction details are believed to be necessary.

The circuit portion 14 comprises a photo detecting element generally indicated at 30 and a transimpedance amplifier (TIA) generally indicated at 32. The photo detecting element 30 is illustrated in the preferred embodiment as a photodiode. However, it should be noted that photodiodes are not the only type of sensor that can be used. For example, a high voltage photodiode (APD), i.e. an avalanche photodiode, can also be used. Accordingly, the term "photo detecting element" is intended to encompass photodiodes as well as other suitable photo detecting elements. One lead 34 of the photodiode 30 is connected to the input of the TIA 32. Three direct signals, Vcc 36, Ground 38 and Data 40 are taken from the TIA and connected to pins 26, 22, and 24 of the can package 12.

The second lead 42 of the photodiode 30 and the fourth output (Data Bar) 44 of the TIA are both connected to the Pin 4 (28) of the package 12 thus superimposing the AC Data Bar signal 44 and the DC RPM signal 46 onto the fourth pin 28. This is possible because the AC signal coming out of Data 40 and Data Bar 44 have an average DC value of zero (since it is a balanced signal of equal ones and zeros). Once the combined signal comes out of the TO can package 12 the two signals 44 and 46 are separated using a capacitor C3 which blocks the DC portion of the RPM signal 46 and allows the AC signal 44 to go through to provide the Data Bar output 44. The DC portion of the RPM signal 46 is extracted prior to the capacitor C3 by tapping the combined signal and filtering the AC information from the combined signal using a Current Sense Circuit 48. The Current Sense Circuit 48 is a well known component in the electronics field and no further description or explanation of function is believed to be necessary.

A capacitor C2 at the Data Bar output 44 prevents the DC component of the Data Bar output signal 44 from passing through. If capacitor C2 was not present, the DC Current Sense Circuit 48 would be corrupted by the DC component of the Data Bar Signal 44.

Resistor R1 and Capacitor C1 make sure that the output Data Bar signal 44 does not feedback to the input of the TIA 32 by removing the AC component of the signal.

Figure 5:
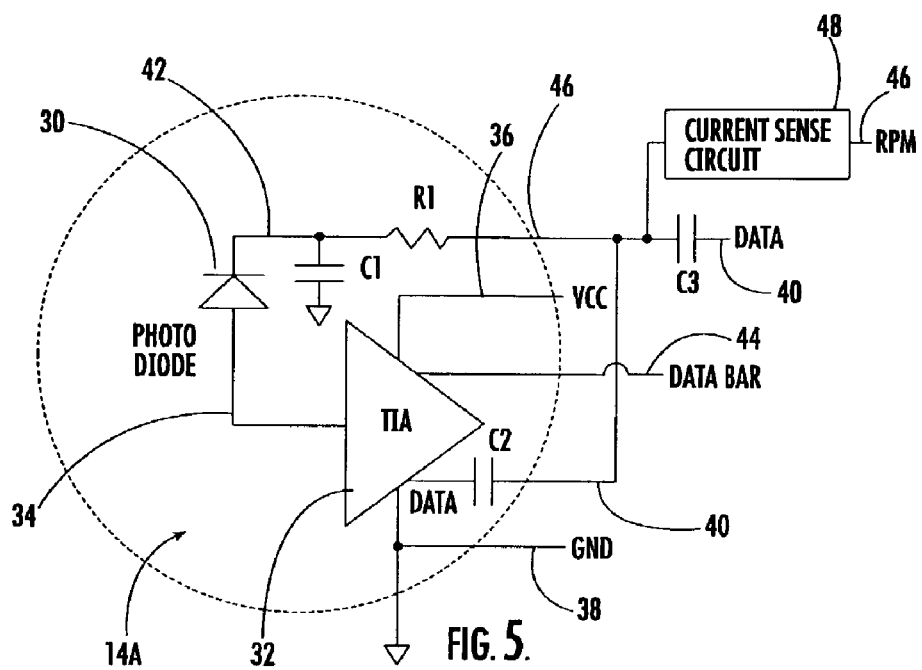
FIG. 5 is a schematic view of a second embodiment of the output signal arrangement of the present invention.

Turning now to FIG. 5, an alternative embodiment of the circuit configuration 14A is illustrated wherein the Data signal 40, rather than the Data Bar signal 44, is superimposed over the RPM signal 46. In this embodiment, Data Bar 44 is a direct output to Pin 3 (26), the Capacitor C2 is provided at the output of the Data Signal 40, and the Data Signal 40 is coupled to the RPM output 46, both coupled to Pin 4 (28). It should be understood that the basic concept of superimposing one of the data signals on the RPM signal is equally applicable to either the Data or Data Bar output and that both embodiments are equally effective within the scope of the invention.

As a further alternative embodiment, it should be understood that the anode and cathode terminals of the photo detecting element 30 could be reversed, thus biasing the photo detecting element with a negative voltage instead of a positive voltage.

It can therefore be seen that the present invention provides a unique and novel packaging and circuit configuration for providing 5 separate signals using only the four standard external pins of a conventional TO can package of an optical receiver. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. An optical signal receiver comprising:
a transimpedance amplifier having a voltage supply, a ground, an analog input, a data output providing a data output signal, and a data bar output providing a data bar output signal;
a photo detecting element having a first terminal coupled to said analog input of said transimpedance amplifier, and a second terminal providing an RPM output signal,
said data bar output being coupled to said second terminal of said photodiode whereby said data bar output signal and said RPM output signal are superimposed;
a current sense circuit coupled to said superimposed RPM and data bar output signals and configured to extract said RPM data signal from said superimposed RPM and data bar output signals to thereby provide a RPM output signal; and
a filter coupled to said superimposed RPM and data bar output signals and configured to block said RPM signal from said superimposed data bar and RPM signals to thereby provide a data bar output signal.

2. The optical signal receiver of claim 1 further comprising feedback means for preventing an AC component of said data bar output signal from feeding back to said analog input of said transimpedance amplifier.

3. The optical signal receiver of claim 1 further comprising filter means for filtering a DC component of said data bar output.

4. The optical signal receiver of claim 2 further comprising feedback means for preventing said RPM output signal from feeding back to said data bar output.

5. The optical signal receiver of claim 1 further comprising a feedback capacitor and a feedback resistor coupled between said second terminal of said photo detecting element and said data bar output and configured to prevent an AC component of said data bar output signal from feeding back to said analog input of said transimpedance amplifier.

6. The optical signal receiver of claim 1 further comprising a filtering capacitor connected to said data bar output and configured to filter a DC component of said data bar output signal from passing through.

7. The optical signal receiver of claim 2 further comprising a filtering capacitor connected to said data bar output and configured to filter a DC component of said data bar output signal from passing through.

8. An optical signal receiver comprising:
a housing having four contact leads;
a transimpedance amplifier within said housing having a voltage supply coupled to a first of said contact leads, a ground coupled to a second of said contact leads, an analog input, a data output connected to a third of said contact leads to provide a data output signal, and a data bar output coupled to a fourth of said contact leads to provide a data bar output signal;
a photo detecting element within said housing having a first terminal coupled to said analog input of said transimpedance amplifier, and a second terminal coupled to said fourth contact lead to provide an RPM output signal,
said data bar output signal and said RPM output signal being superimposed on said fourth contact lead;
a current sense circuit external of said housing coupled to said fourth contact lead and configured to extract said RPM data signal from said superimposed RPM and data bar output signals to thereby provide a RPM output signal; and
a filter external of said housing coupled to said fourth contact lead and configured to block said RPM signal from said superimposed data bar and RPM signals to thereby provide a data bar output signal.

9. The optical signal receiver of claim 8 further comprising feedback means for preventing an AC component of said data bar output signal from feeding back to said analog input of said transimpedance amplifier.

10. The optical signal receiver of claim 8 further comprising filter means for filtering a DC component of said data bar output.

11. The optical signal receiver of claim 9 further comprising filter means for filtering a DC component of said data output.

12. The optical signal receiver of claim 8 further comprising a feedback capacitor and a feedback resistor coupled between said second terminal of said photo detecting element and said data bar output and configured to prevent an AC component of said data bar output signal from feeding back to said analog input of said transimpedance amplifier.

13. The optical signal receiver of claim 8 further comprising a filtering capacitor connected to said data bar output and configured to filter a DC component of said data bar output signal from passing through.

14. The optical signal receiver of claim 9 further comprising a filtering capacitor connected to said data bar output and configured to filter a DC component of said data bar output signal from passing through.

15. A method of operating an optical signal receiver to provide 5 signals from only 4 separate contact leads of an optical signal receiver housing package, said method comprising the steps of:
providing an optical signal receiver housing having four external contact leads;
providing a transimpedance amplifier within said housing, said transimpedance amplifier having a voltage supply coupled to a first of said contact leads, a ground coupled to a second of said contact leads, an analog input, a first data output connected to a third of said contact leads to provide a first data output signal, and a complementary second data output;
providing a photo detecting element within said housing, said photo detecting element having a first terminal coupled to said analog input of said transimpedance amplifier, and a second terminal coupled to said fourth contact lead to provide an RPM output signal;
coupling said first data output to said fourth contact lead so as to superimpose said first data output signal and said RPM output signal on said fourth contact lead;
extracting, external of said housing, said RPM data signal from said superimposed RPM and first data output signals to thereby provide a RPM output signal; and
filtering, externally of said housing, said RPM signal from said superimposed first data and RPM signals to thereby provide a first data output signal.

16. The method of claim 15 further comprising the step of preventing an AC component of said first data output signal from feeding back to said analog input of said transimpedance amplifier.

17. The method of claim 15 further comprising the step of filtering a DC component of said first data output signal.

18. The method of claim 16 further comprising the step of filtering a DC component of said first data output signal.

19. An optical signal receiver comprising:
a transimpedance amplifier having a voltage supply, a ground, an analog input, a first data output providing a first data output signal, and a second data output providing a complementary second data output signal;
a photo detecting element having a first terminal coupled to said analog input of said transimpedance amplifier, and a second terminal providing an RPM output signal, said first data output being coupled to said second terminal of said photo detecting element whereby said first data output signal and said RPM output signal are superimposed;
a current sense circuit coupled to said superimposed RPM and first data output signals and configured to extract said RPM data signal from said superimposed RPM and first data output signals to thereby provide a RPM output signal; and
a filter coupled to said superimposed RPM and first data output signals and configured to block said RPM signal from said superimposed first data and RPM signals to thereby provide a first data output signal.

20. The optical signal receiver of claim 19 further comprising feedback means for preventing an AC component of said first data output signal from feeding back to said analog input of said transimpedance amplifier.

21. The optical signal receiver of claim 19 further comprising feedback means for preventing said RPM output signal from feeding back to said data output.

22. The optical signal receiver of claim 20 further comprising filter means for filtering a DC component of said data output.

23. The optical signal receiver of claim 19 further comprising a feedback capacitor and a feedback resistor coupled between said second terminal of said photo detecting element and said data output and configured to prevent an AC component of said data output signal from feeding back to said analog input of said transimpedance amplifier.

24. The optical signal receiver of claim 19 further comprising a filtering capacitor connected to said data output and configured to filter a DC component of said data bar output signal from passing through.

25. The optical signal receiver of claim 20 further comprising a filtering capacitor connected to said data output and configured to filter a DC component of said data output signal from passing through.

26. An optical signal receiver comprising:
a housing having four contact leads;
a transimpedance amplifier within said housing having a voltage supply coupled to a first of said contact leads, a ground coupled to a second of said contact leads, an analog input, a first data output connected to a third of said contact leads to provide a first data output signal, and a complementary second data output coupled to a fourth of said contact leads to provide a second data output signal;
a photo detecting element within said housing having a first terminal coupled to said analog input of said transimpedance amplifier, and a second terminal coupled to said fourth contact lead to provide an RPM output signal,
said first data output signal and said RPM output signal being superimposed on said fourth contact lead;
a current sense circuit external of said housing coupled to said fourth contact lead and configured to extract said RPM data signal from said superimposed RPM and first data output signals to thereby provide a RPM output signal; and
a filter external of said housing coupled to said fourth contact lead and configured to block said RPM signal from said superimposed first data and RPM signals to thereby provide a first data output signal.

27. The optical signal receiver of claim 26 further comprising feedback means for preventing an AC component of said first data output signal from feeding back to said analog input of said transimpedance amplifier.

28. The optical signal receiver of claim 26 further comprising filter means for filtering a DC component of said first data output.

29. The optical signal receiver of claim 27 further comprising filter means for filtering a DC component of said first data output.

30. The optical signal receiver of claim 26 further comprising a feedback capacitor and a feedback resistor coupled between said second terminal of said photo detecting element and said first data output and configured to prevent an AC component of said first data output signal from feeding back to said analog input of said transimpedance amplifier.

31. The optical signal receiver of claim 26 further comprising a filtering capacitor connected to said first data output and configured to filter a DC component of said first data output signal from passing through.

32. The optical signal receiver of claim 27 further comprising a filtering capacitor connected to said first data output and configured to filter a DC component of said first data output signal from passing through.

* * * * *